H. J. FOSTER AND E. GRUENFELDT.
SHEET METAL WHEEL.
APPLICATION FILED AUG. 23, 1918.
1,340,220. Patented May 18, 1920.
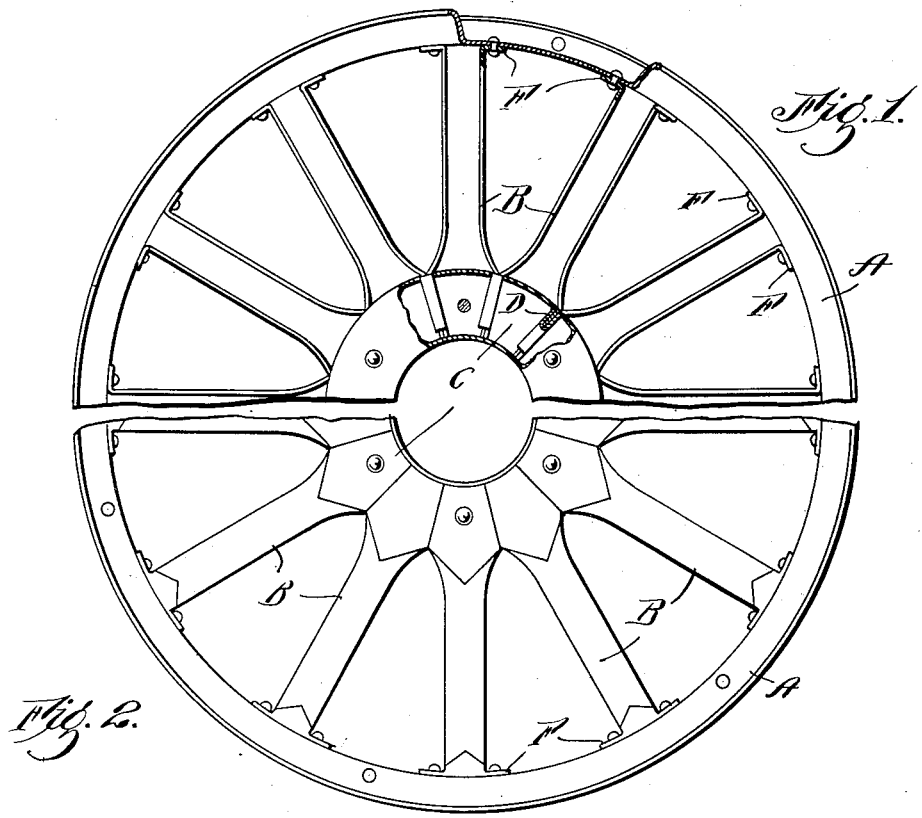
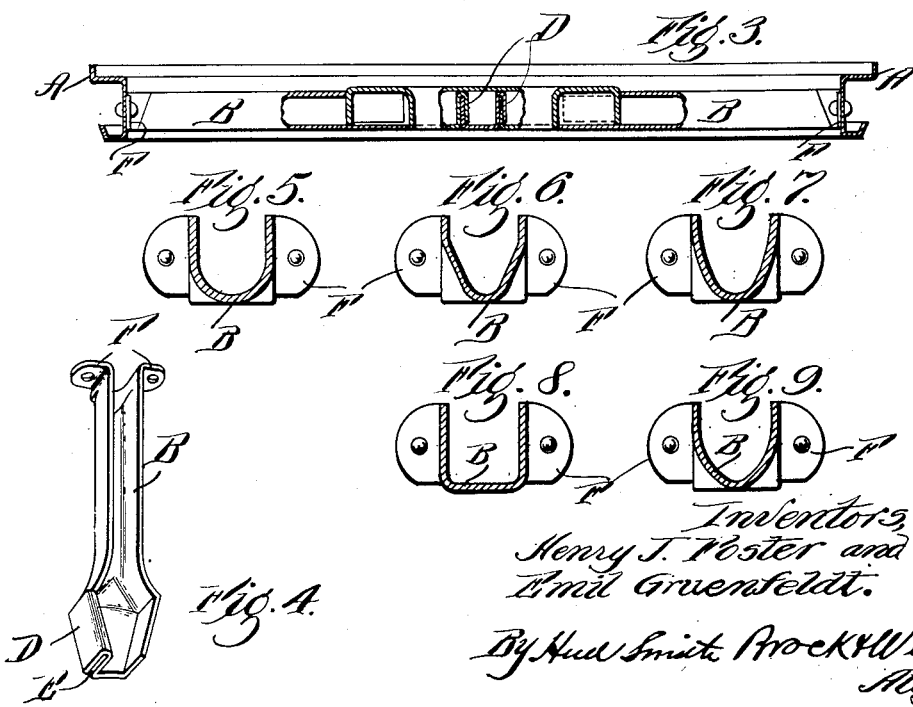

UNITED STATES PATENT OFFICE.

HENRY J. FOSTER AND EMIL GRUENFELDT, OF CLEVELAND, OHIO, ASSIGNORS TO HYDRAULIC PRESSED STEEL COMPANY, OF CLEVELAND, OHIO, A CORPORATION OF OHIO.

SHEET-METAL WHEEL.

1,340,220.  Specification of Letters Patent.  Patented May 18, 1920.

Application filed August 23, 1918. Serial No. 251,081.

*To all whom it may concern:*

Be it known that (1) HENRY J. FOSTER, (2) EMIL GRUENFELDT, citizens of the United States, residing at Cleveland, in the county of Cuyahoga and State of Ohio, have invented a certain new and useful Improvement in Sheet-Metal Wheels, of which the following is a full, clear, and exact description, reference being had to the accompanying drawings.

This invention relates generally to wheels and more particularly to a sheet metal wheel composed of a plurality of sheet metal spokes connected to one another and to a sheet metal felly which is preferably constructed to receive a demountable tire carrying rim.

The object of the invention is to provide a simple and efficient wheel, one which will be economical in use of sheet metal and one which will combine lightness with strength and durability.

Another object is to provide a sheet metal wheel of the type described in which the parts thereof can be quickly and easily assembled and securely united.

With these and other objects in view the invention consists in certain details of construction and novelties of combination all of which will be fully set forth as the detail description proceeds and then pointed out in the appended claims.

In the drawings forming a part of this specification Figure 1 is an elevation partly in section showing one half of the inner face of a sheet metal wheel embodying one form of our invention. Fig. 2 is an elevation showing one half of the outer face of said wheel; Fig. 3 is a transverse sectional view of said wheel; Fig. 4 is a detail perspective view of one of the spokes and Figs. 5, 6, 7, 8 and 9 are detail sectional views showing different cross sectional shapes of spokes.

In carrying out the invention we employ a continuous felly or fixed rim A, which is rolled from sheet metal, and is as near a true circle as it is possible to make commercially. This felly or rim may be any desired cross sectional shape or area. Any desired number of spokes B may be arranged within this felly or fixed rim and we have illustrated a wheel comprising 12 spokes. The spokes are made of sheet metal and each one is U-shaped in cross section from end to end and in Figs. 5 to 9 inclusive, we have shown the various cross sectional shapes of said spokes. The spokes are tapered at their inner ends as shown at C so that when assembled these tapered ends contact and form the nave of the wheel.

Each tapered end C is provided with an extension D at one side which is preferably of a length equal to the length of the tapered portion, and the width of this extension is preferably equal to the width of the side to which it is integrally united; and this extension D is bent back upon the side into parallel relation therewith providing a radial interlocking groove E at that side of the spoke and adapted to receive the contacting side of the adjacent spoke, and as all of the spokes are constructed alike it is obvious that when they are all assembled each inner spoke end will be interlocked at each side with the next adjacent spoke end, one side of each spoke being received into a groove, while the other side is receiving in its interlocking groove, the side of the next adjacent spoke.

At their outer ends, each spoke is provided with oppositely disposed laterally or circumferentially projecting ears F, and after the spokes have been assembled and interlocked at their inner ends the assembled and interlocked spokes are placed within the sheet metal felly A, the laterally projecting ears contacting with or nearly contacting with the inner face of said sheet metal felly or rim and these ears are rigidly connected to the felly by rivets or welding as desired.

A wheel constructed as above described can be quickly and easily assembled and the parts securely united. If desired the interlocking edges of the inner ends of the spokes could be welded together but such union is not absolutely necessary. The spokes being U-shaped in cross section will provide a very strong structure and at the same time an exceedingly light one. Any type of hub flanges can be applied to the faces of the wheel body and connected to the spoke ends in any suitable manner, either permanently or detachably. If necessity should arise one or more spokes could be removed and new ones substituted in their place.

Having thus described our invention, what we claim is:—

1. A sheet metal wheel comprising sheet metal spokes, having tapered inner ends open at one side, and integral lateral extensions carried by said tapered ends, adapted to engage the sides of the next adjacent ends.

2. A sheet metal wheel comprising sheet metal spokes, having tapered inner ends each open at one side, and means for locking the sides of said open ends together.

3. In a sheet metal wheel, the combination with a sheet metal felly, and sheet metal spokes, U-shaped in cross section, the inner ends of said spokes being tapered, each tapered end having a lateral extension bent back and adapted to form an interlocking groove.

4. A sheet metal wheel comprising a felly and a plurality of spokes each spoke being U-shaped in cross section, the inner end thereof having an extension bent back upon itself and adapted to engage the side of the next adjacent spoke.

5. A sheet metal spoke, U-shaped in cross section, the outer end being provided with laterally projecting ears, the inner end being tapered and provided at one side with an interlocking return bend.

In testimony whereof we hereunto affix our signatures.

HENRY J. FOSTER.
EMIL GRUENFELDT.